United States Patent [19]

Brandener

[11] Patent Number: 5,149,068
[45] Date of Patent: Sep. 22, 1992

[54] RESILIENT ANTI-VIBRATION SLEEVE, IN PARTICULAR FOR AN EXHAUST COUPLING

[75] Inventor: Louis Brandener, Poissy, France

[73] Assignee: Societe Jacques Dubois, Barentin, France

[21] Appl. No.: 663,610

[22] Filed: Mar. 4, 1991

[30] Foreign Application Priority Data

Mar. 15, 1990 [FR] France .................. 90 03333

[51] Int. Cl.⁵ .................. F16F 7/00
[52] U.S. Cl. .................. 267/147
[58] Field of Search .................. 267/147

[56] References Cited

U.S. PATENT DOCUMENTS

| 2,755,079 | 7/1956 | York et al. | 267/147 |
| 4,928,998 | 5/1990 | Dubois | 285/49 |

FOREIGN PATENT DOCUMENTS

| 1063211 | 6/1952 | France . | |
| 1071214 | 4/1954 | France | 267/147 |
| 1203267 | 1/1958 | France | 267/147 |
| 577282 | 3/1958 | Italy | 267/147 |
| 199966 | 7/1922 | United Kingdom . | |
| 703731 | 2/1954 | United Kingdom | 267/147 |
| 778513 | 1/1956 | United Kingdom . | |
| 1176791 | 10/1965 | United Kingdom . | |

*Primary Examiner*—Matthew C. Graham
*Attorney, Agent, or Firm*—Griffin, Branigan & Butler

[57] ABSTRACT

A resilient anti-vibration sleeve of the invention comprises a mass of compressed steel wire surrounded by a maintaining strip made of metal wire wound helically around the mass of compressed steel wire and having its ends fixed to the mass of compressed steel wire.

3 Claims, 1 Drawing Sheet

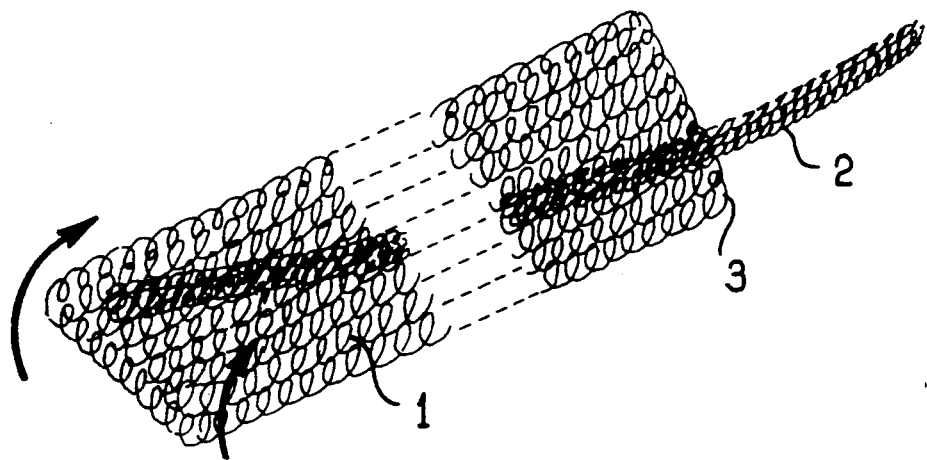
FIG._1
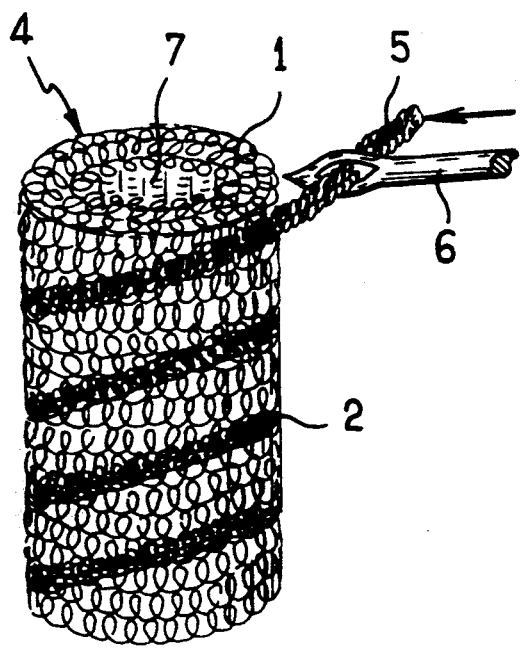
FIG._2
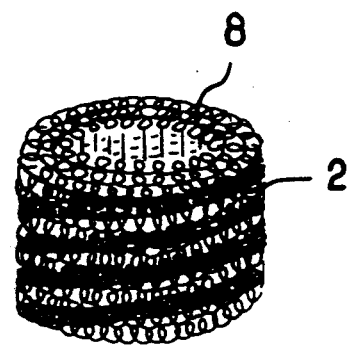
FIG._3

RESILIENT ANTI-VIBRATION SLEEVE, IN PARTICULAR FOR AN EXHAUST COUPLING

The present invention relates to a resilient anti-vibration sleeve, and to a method of manufacturing such a sleeve.

BACKGROUND OF THE INVENTION

Resilient anti-vibration sleeves are known, in particular, for use in flexible couplings in exhaust pipes, and they are made from a strip of steel wire knit rolled up to form a cylindrical preform and then compressed axially to obtain a resilient anti-vibration sleeve ready for mounting. Making such a sleeve gives rise to a cohesion problem both during manufacture of the preform where it is necessary to keep the strip of steel wire knit rolled up prior to its insertion in a mold for axial compression, and also during use where the resilient sleeve is subjected to additional axial compression forces that tend to deform the sleeve and cause it to take up a barrel shape with the attendant risk of causing the steel wire knit to unroll in spite of its stitches being tangled together by the inital axial compression of the preform.

To cope with these problems, resilient sleeves have been made in which the cylindrical preform of steel wire knit is kept rolled up either by stitching the end of the strip of steel wire knit, or by stapling the end of the strip of steel wire knit, or else by installing crimping rings, e.g. copper rings. All of these solutions suffer from drawbacks, either to do with cost when manufactured on an industrial scale, or else to do with losing a fraction of the performance of the sleeve, and in particular its elasticity in a longitudinal direction. It has also been envisaged that the cylindrical perform could be wrapped in a very thin metal foil, however this solution is unsatisfactory since even when using a metal foil that is very thin, it reduces the resilient properties of the sleeve too much after it has been compressed axially.

An object of the present invention is to provide a resilient anti-vibration sleeve capable of being made on an industrial scale under satisfactory conditions and having good cohesion, both during manufacture and during use.

SUMMARY OF THE INVENTION

To achieve this object, the present invention provides a resilient anti-vibration sleeve comprising a mass of compressed steel wire and a maintaining strip of metal wire wound helically around the mass of compressed steel wire, with the ends thereof being fixed to the mass of compressed steel wire.

Thus, winding the maintaining strip around the mass of compressed steel wire ensures that this mass has cohesion, and the helical shape of this winding minimizes changes to the resilient characteristics of the sleeve.

In an advantageous version of the invention, the maintaining strip is a strip of steel wire knit, and preferably a portion of flattened tubular knit. It has been found that this embodiment is particularly cheap to implement and that the maintaining strip obtained in this way has excellent properties both from the point of view of the traction that must be exerted on the maintaining strip in its longitudinal direction in order to maintain the cohesion of the resilient sleeve, and from the point of view of its deformation flexibility in a direction transverse to the longitudinal direction of the strip, thereby keeping the axial resilience of the resilient sleeve.

In another aspect, the present invention provides a method of manufacturing a resilient anti-vibration sleeve, the method comprising the steps of rolling up a strip of steel wire knit to form a cylindrical perform and of compressing the cylindrical preform axially to form a mass of compressed steel wire, wherein a further step is provided of winding a maintaining strip of metal wire helically around the cylindrical preform and of fixing the ends of the maintaining strip to the cylindrical preform.

The method of the invention is preferably implemented by placing one end of the maintaining strip on the strip of steel wire knit before rolling it up, and by rolling up the maintaining strip and the strip of steel wire knit simultaneously in such a manner that the maintaining strip is on the inside of the turns of the strip of steel wire knit with which it is associated, and then winding the maintaining strip helically around the preform, and finally punching the free ends of the maintaining strip into the cylindrical preform.

BRIEF DESCRIPTION OF THE DRAWING

An embodiment of the invention is described by way of example with reference to the accompanying drawing, in which:

FIG. 1 is a perspective view of a strip of steel wire knit and of an associated maintaining strip before rolling up the preform;

FIG. 2 is a perspective view of the preform after the maintaining strip has been wound thereabout and before the second end of the maintaining strip has been fixed; and FIG. 3 is a perspective view of the resilient sleeve of the invention as obtained after axial compression.

DETAILED DESCRIPTION

With reference to the drawing, the resilient anti-vibration sleeve of the invention is made from a strip of steel wire knit 1. The strip of steel wire knit is obtained, for example, by flattening a tubular knit formed on a circular knitting machine using a steel wire having a diameter of 0.2 mm and a tenacity of 180 kg/mm$^2$.

In a preferred implementation of the method of the invention, a maintaining strip 2 is simultaneously provided by flattening a tubular knit obtained from steel wire having a diameter of 0.1 mm and having a tenacity of 80 kg/mm$^2$. One end of the maintaining strip 2 is placed on the strip of metal wire knit 1 prior to it being rolled up, and preferably in such a manner as to ensure that the maintaining strip 2 passes in the vicinity of a corner 3 of the strip of steel wire knit 1. The strip of steel wire knit 1 is then rolled up as shown by the heavy-line arrows in FIG. 1 so that the maintaining strip 2 is on the inside of the turns of the strip of steel wire knit with which it is associated.

After the strip of steel wire knit 1 has been rolled up to form a cylindrical preform indicated by overall reference 4 in FIG. 2, the portion of the maintaining strip 2 which extends beyond the end of the strip of steel wire knit 1 is wound helically around the preform 4. The free end 5 of the maintaining strip 2 is then engaged in the eye of a punch 6 which is displaced radially as shown by the arrow in FIG. 2 so as to fix the end of the maintaining strip 2 in the cylindrical preform 4. There is no need to cut off a finite length of the maintaining strip prior to installing the maintaining strip. Assuming that the maintaining strip 2 extends beyond the punch 6, then two thicknesses of the maintaining strip 2 are inserted radially by the punch 6, and in this case the punch 6 is caused to penetrate into the central channel 7 of the preform, and while it is in this position the maintaining strip 2 is cut flush with the punch 6 so that the punch 6 can be withdrawn without entraining the end of the maintaining strip 2 which has been inserted radially.

After the preform 4 has been compressed axially, a resilient sleeve is obtained as shown in FIG. 3, which sleeve comprises a mass of compressed steel wire 8 surrounded by a helical metal wire maintaining strip whose ends are fixed to the mass of compressed steel wire.

Naturally the invention is not limited to the embodiment described and variant embodiments may be provided without going beyond the scope of the invention. In particular, although the maintaining strip 2 has been described with reference to an embodiment in which said maintaining strip is formed from a flattened tubular knit, it would be possible to use a maintaining strip that was knitted flat or that was made from woven or braided metal wire. Similarly, although one of the ends of the maintaining strip in the embodiment described is fixed by punching while its other end is held by clamping between the turns of the strip of steel wire knit constituting the preform, both ends of the maintaining strip could be fixed in the same manner, by punching, or even by stapling since the small number of staples required for fixing the maintaining strip 2 is not deleterious to proper operation of the resulting resilient sleeve.

It may also be observed in FIG. 2 that in the preferred embodiment described, the maintaining strip 2 is substantially narrower than the strip of steel wire knit 1. For example, for a strip of steel wire knit 1 that is about 65 mm wide, it is advantageous to use a maintaining strip 2 having a width of about 5 mm, thereby enabling the maintaining strip to be wound in a plurality of turns without these turns of the maintaining strip touching one another, even after axial compression. In this context, it may also be observed that because the maintaining strip 2 is wound helically, the resilient properties of the resulting sleeve are not significantly altered even if the turns of the maintaining strip do touch one another or overlap. However, for obvious reasons of cost, it is desirable to minimize the number of turns of the maintaining strip, compatible with ensuring sufficient cohesion for the resilient sleeve.

Although the illustrated embodiment of the maintaining strip 2 extends over the entire length of the strip of steel wire knit 1, the maintaining strip 2 may be placed on a portion only of the length of the strip of steel wire knit 1 providing the clamping effect is sufficient to retain said end of the retaining strip 2.

Although the maintaining strip 2 in the embodiment described is made from a steel wire having tenacity that is substantially less than the tenacity of the steel wire forming the strip of steel wire knit 1, it would also be possible to use a steel wire having tenacity closer to that of the strip of steel wire knit 1, or, in contrast, a different metal wire, depending on the cohesion force that needs to be applied to the preform 1 by suitable traction in the maintaining strip 2 to keep the preform rolled up.

It may be observed that it is important that the maintaining strip 2 is not constituted merely by a single helically-wound wire since the traction required to maintain preform cohesion would tend either to create local stresses in the preform, thereby making it difficult to obtain a resilient sleeve having a uniform outside surface, or else, in the event of low traction, running the risk of causing the wire to slide during axial compression.

I claim:

1. A resilient anti-vibration sleeve comprising a cylindrical mass of compressed steel wire and a maintaining strip made of one of knitted, woven and braided metal wire, said resilient sleeve with said maintaining strip having a spring constant substantially similar to that of the mass of compressed steel wire, the strip being helically wound around the outer surface of the mass of compressed steel wire, with the ends thereof being rigidly fixed to the mass of compressed steel wire.

2. A resilient sleeve according to claim 1, wherein the maintaining strip is a strip of steel wire knit.

3. A resilient strip according to claim 2, wherein the maintaining strip is a portion of a flattened tubular knit.

* * * * *